(12) United States Patent
Bae (10) Patent No.: US 11,575,706 B2
(45) Date of Patent: Feb. 7, 2023

(54) NETWORK-BASED DOCUMENT PROTECTION SYSTEM FOR PROTECTION OF BUSINESS SECRET

(71) Applicant: SOFTCAMP CO., LTD., Gyeonggi-do (KR)

(72) Inventor: Hwan-Kuk Bae, Gyeonggi-do (KR)

(73) Assignee: SOFTCAMP CO., LTD., Gyeonggi-do (KR)

( * ) Notice: Subject to any disclaimer, the term of this patent is extended or adjusted under 35 U.S.C. 154(b) by 206 days.

(21) Appl. No.: 16/747,376

(22) Filed: Jan. 20, 2020

(65) Prior Publication Data

US 2020/0236137 A1 Jul. 23, 2020

(30) Foreign Application Priority Data

Jan. 23, 2019 (KR) ........................ 10-2019-0008458

(51) Int. Cl.
*H04L 29/06* (2006.01)
*H04L 9/40* (2022.01)
*G06F 16/955* (2019.01)
*G06F 16/93* (2019.01)

(52) U.S. Cl.
CPC .......... *H04L 63/1466* (2013.01); *G06F 16/94* (2019.01); *G06F 16/9558* (2019.01); *H04L 63/0428* (2013.01); *H04L 63/1425* (2013.01); *H04L 63/20* (2013.01)

(58) Field of Classification Search
CPC ............. H04L 63/1466; H04L 63/0425; H04L 63/1425; H04L 63/20; G06F 16/9558; G06F 16/94
See application file for complete search history.

(56) References Cited

U.S. PATENT DOCUMENTS

| 2002/0046224 A1* | 4/2002 | Bendik | .................. | G06Q 10/10 715/200 |
| 2002/0120858 A1* | 8/2002 | Porter | .................. | G06F 40/123 726/4 |
| 2003/0009468 A1* | 1/2003 | Lamkin | .................. | G06Q 40/00 |

(Continued)

FOREIGN PATENT DOCUMENTS

| JP | 20004070875 | 3/2004 |
| KR | 1020070052073 | 5/2007 |
| KR | 1020120128412 | 11/2012 |

*Primary Examiner* — Vance M Little
(74) *Attorney, Agent, or Firm* — IPLA P.A.

(57) ABSTRACT

A network-based document protection system for the protection of business secret includes: a template module configured to search for the template information of a template stored in a template database (DB) or the document information of a document stored in a document DB, and to execute the corresponding template or document via a dedicated application; an authentication module configured to generate the document information by including the identification code of an operator in the corresponding template information or to identify a corresponding operator by recognizing an identification code from the document information of the executed document, according to the execution procedure of the template module; and a security module configured to store the document, generated or updated via the dedicated application, in the document DB, and to perform security processing on the document.

5 Claims, 8 Drawing Sheets

(56) References Cited

U.S. PATENT DOCUMENTS

| | | | |
|---|---|---|---|
| 2005/0132070 A1* | 6/2005 | Redlich | G06F 21/6209 709/228 |
| 2008/0104408 A1* | 5/2008 | Mayer | H04N 1/32112 713/178 |
| 2014/0013112 A1* | 1/2014 | Cidon | G06F 16/137 713/165 |
| 2016/0180107 A1* | 6/2016 | Panchbudhe | G06F 21/6218 726/28 |

\* cited by examiner

NETWORK-BASED DOCUMENT PROTECTION SYSTEM FOR PROTECTION OF BUSINESS SECRET

CROSS-REFERENCE

This application claims the benefit of Korean Patent Application No. 10-2019-0008458 filed on Jan. 23, 2019, which is hereby incorporated by reference herein in its entirety.

BACKGROUND

The present invention relates to a network-based document protection system for the protection of business secret, which sets the security level of a corresponding document according to objective criteria without depending on the subjective judgment of an operator and enables the original of the protection target document to be protected and one or more persons in charge to be determined through the tracking of the distribution of the document.

As is well known, a company is a group of a plurality of operators who are gathered for the purpose of creating profits. Accordingly, operators who belong to a company create and distribute a numerous number of document files (hereinafter referred to as "documents") in order to communicate with each other to create profits. By the way, a document created by an operator may contain information that can be disclosed to the outside, but may contain information that is limited as confidentiality. Moreover, a document containing technical and other important data should not be disclosed to the outside for a reason of business secret, and various additional tasks required for ensuring business secret may be required of a person in charge.

For this purpose, conventionally, an operator who is creating a document directly sets the security level of a corresponding document according to a designated rule, and stores and manages the security level of the corresponding document in a designated security server.

However, since the conventional security technology is intended to enable an operator to directly set a security level, a confidential document may be leaked to the outside by incorrect security level setting, or an operator may maliciously leak a confidential document.

Furthermore, the conventional security technology enables an operator to identify a person in charge for each document by electronically signing a document whose security level is set to a confidential level. However, the conventional security technology manages a document in such a manner that it updates the document every time without separately registering the hash of a first created document. However, since a hash is newly generated whenever a document itself is loaded and a digital signature is made, an original hash is extinguished, through which a basis for providing that the corresponding document is an original is lost. Furthermore, the hash of the document is repeatedly generated and extinguished through the performance of an operator, and thus it is impossible to track the distribution process of the corresponding document. In other words, the conventional security technology cannot prove whether or not a document held by the company is an original or an external document that has been modified more than once.

Related art document 1: Korean Patent Application Publication No. 10-2007-0052073 (published on May 21, 2007)

SUMMARY OF THE INVENTION

The present invention has been conceived to overcome the above-described problems, and an object of the present invention is to provide a network-based document protection system for the protection of business secret, which sets the security level of a corresponding document according to objective criteria without depending on the subjective judgment of an operator and enables the original of the protection target document to be protected and one or more persons in charge to be determined through the tracking of the distribution of the document.

In order to accomplish the above object, the present invention provides a network-based document protection system for protection of business secret, the network-based document protection system including:

a template module configured to search for the template information of a template stored in a template database (DB) or the document information of a document stored in a document DB, and to execute the corresponding template or document via a dedicated application;

an authentication module configured to generate the document information by including the identification code of an operator in the corresponding template information or to identify a corresponding operator by recognizing an identification code from the document information of the executed document, according to the execution procedure of the template module; and a security module configured to store the document, generated or updated via the dedicated application, in the document DB, and to perform security processing on the document.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE INVENTION

The above-described features and effects of the present invention will be apparent from the following detailed description taken in conjunction with the accompanying drawings, and accordingly those having ordinary skill in the art to which the present invention pertains can easily practice the technical spirit of the present invention. Although the present invention may be subject to various modifications, and may have various forms, specific embodiments will be illustrated in the drawing and described in detail below. However, this is not intended to limit the present invention to the specific embodiments. It should be understood that the present invention encompasses all modifications, equivalents, and substitutes included in the technical spirit and scope of the present invention. The terms used herein are used only to describe the specific embodiments, and are not intended to limit the invention.

Details of the present invention will be described with reference to the accompanying drawings below.

Figure 1:
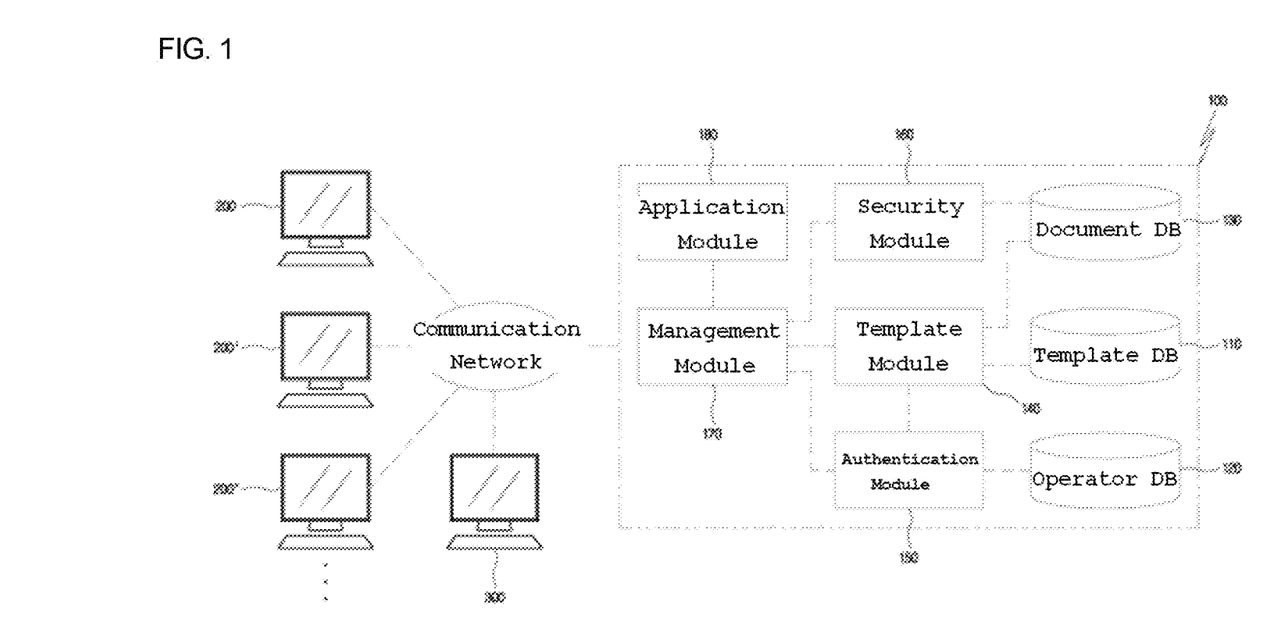
FIG. 1 is a block diagram showing a document protection system according to an embodiment of the present invention.

FIG. 1 is a block diagram showing a document protection system according to an embodiment of the present invention.

The document protection system according to the present embodiment of the present invention includes: a template module 140 configured to search for the template information of a template stored in a template database (DB) 110 or the document information of a document stored in a document DB 130, and to execute the corresponding template or document via a dedicated application; an authentication module 150 configured to generate document information by including the identification code of an operator in the corresponding template information or to identify a corresponding operator by recognizing an identification code from the document information of the executed document, according to the execution procedure of the template module 140; and a security module 160 configured to store the document, generated or updated via the dedicated application, in the document DB 130, and to perform security processing on the document.

More specifically, the template DB 110 manages and stores the template information, including the content of the template, and name and storage path-related keywords, and information about the dedicated application, which are information set in the template, as data.

The document DB 130 manages and stores the document information, including the content of the document, and name and storage path-related keywords, information about the dedicated application, and an operator identification code, which are information set in the document, as data.

The template module 140 searches for the template information of the template stored in the template DB 110 or the document information of the document stored in the document DB 130, and executes the corresponding template or document via the dedicated application. Accordingly, a search algorithm and a user interface (UI) configured to allow an operator to search for a template or document are provided, and the operator may search for and execute a template or document according to the execution procedure of the template module 140. Meanwhile, the template module 140 generates a document or update document information by including a name, a storage path and an operator identification code corresponding to attribute information in document information according to a command value of an operator, and stores the document or document information in the document DB 130. In the present embodiment, the template and the document are Word files, and are configured to work in conjunction with a word processor for executing the Word files. For reference, each of the Word files includes not only general text but also an image, media, and a graph, and may be modified and practiced in various manners within a range that does not depart from the scope of the present invention as long as it can be generated and updated through work by an operator.

The authentication module 150 generates document information including the identification code of the operator in the corresponding template information or identify the corresponding operator by recognizing the identification code in the document information of the executed document, according to the execution procedure of the template module 140. The execution procedure refers to a series of processes that executes the dedicated application in order to execute the template or document retrieved by the template module 140 and outputs the corresponding template or document via the terminal 200, 200', or 200" (hereinafter referred to as "200") of the operator. Meanwhile, when the template is executed via the dedicated application, the authentication module 150 generates document information by searching the operator DB 120 and including the identification code of a corresponding operator in corresponding template information. Furthermore, when the document is retrieved via the template module 140 and executed via the dedicated application, the authentication module 150 identifies the operator of the corresponding document via the identification code included in the document information of the document. For reference, the operator DB 120 stores and manages the personal information of operators and various types of identification codes, and controls per-operator document management and the per-security level access of the operator to the system in conjunction with the authentication module 150.

The security module 160 performs security processing on the document generated or updated via the dedicated application, and stores the document in the document DB 130. The security module 160 may perform security processing by encrypting and decrypting the document, and may store and execute the document by applying virtual area technology. In addition, any known technology may be modified and practiced in various manners within a range that does not depart from the scope of the present invention as long as it can perform security processing on document file management.

The management module 170 monitors the processes of the template module 140, the authentication module 150 and the security module 160, transmits corresponding data to the administrator console 300, and controls and manages the operations of the template module 140, the authentication module 150 and the security module 160 according to a control value received from the administrator console 300.

The application module 180 processes the file of the document executed by the template module 140, and mails the file. The document protection system according to the present embodiment includes a document protection apparatus 100 including template the DB 110, the operator DB 120, the document DB 130, the template module 140, the authentication module 150, the security module 160, and the management module 170. The application module 180 sends the corresponding document to a designated recipient by e-mail according to a control value of the management module 170 corresponding to a command value of the operator. The recipient receives the document via the application module 180, and the document received as described above is stored in the document DB 130 through the processing of the security module 160. For reference, the application module 180 may mail the document file itself, or may convert the document file into a different extension format, such as PDF, JPG, or TXT, and then mail the resulting file.

The above-described component modules will be described more specifically through the following embodiment.

Figure 3:
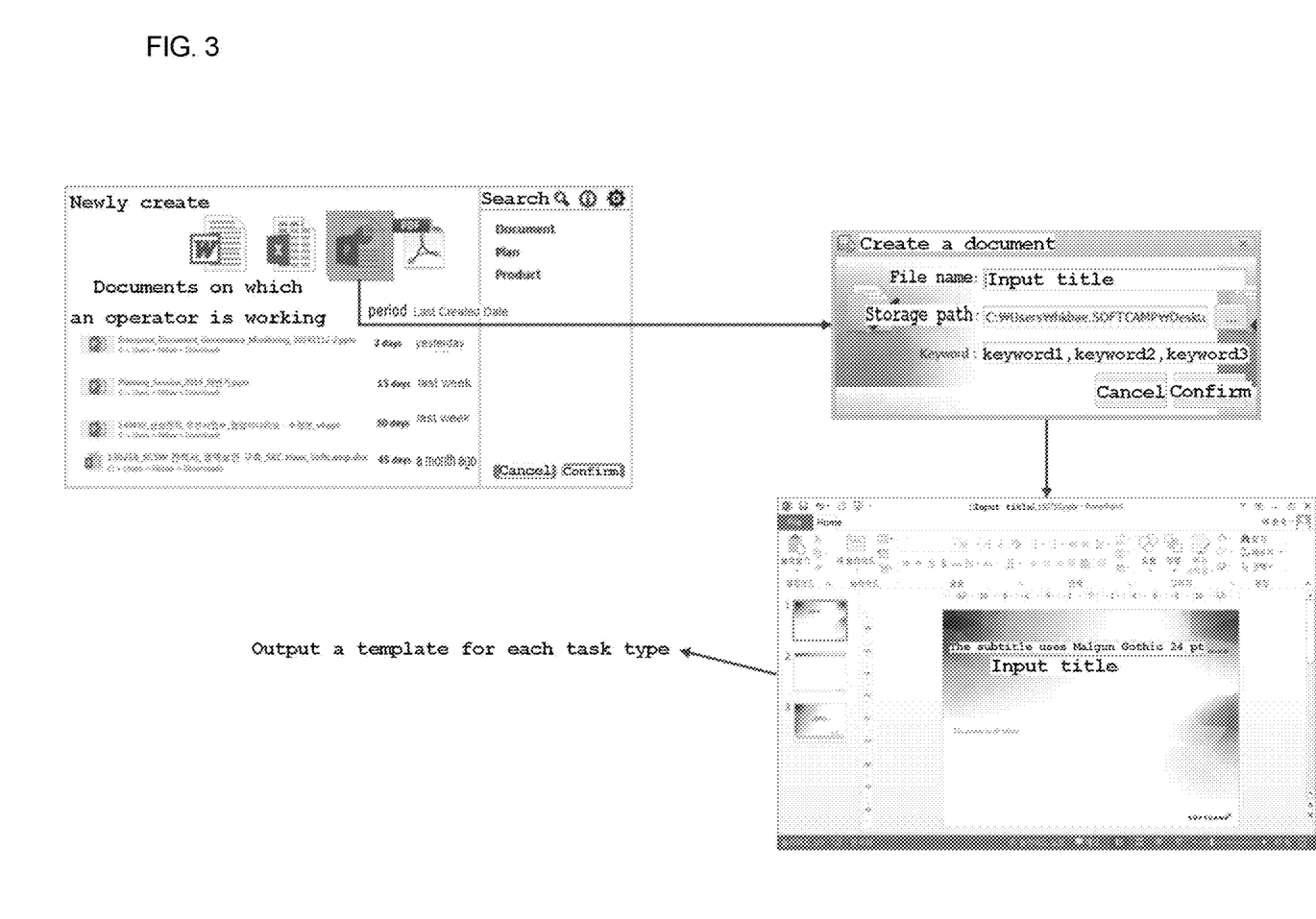
FIG. 3 shows UI images illustrating the configurations of a template search layer, a document attribute setting layer, and a template layer and the configuration of a generation window that are output by the document protection system according to the present invention.
Figure 4:
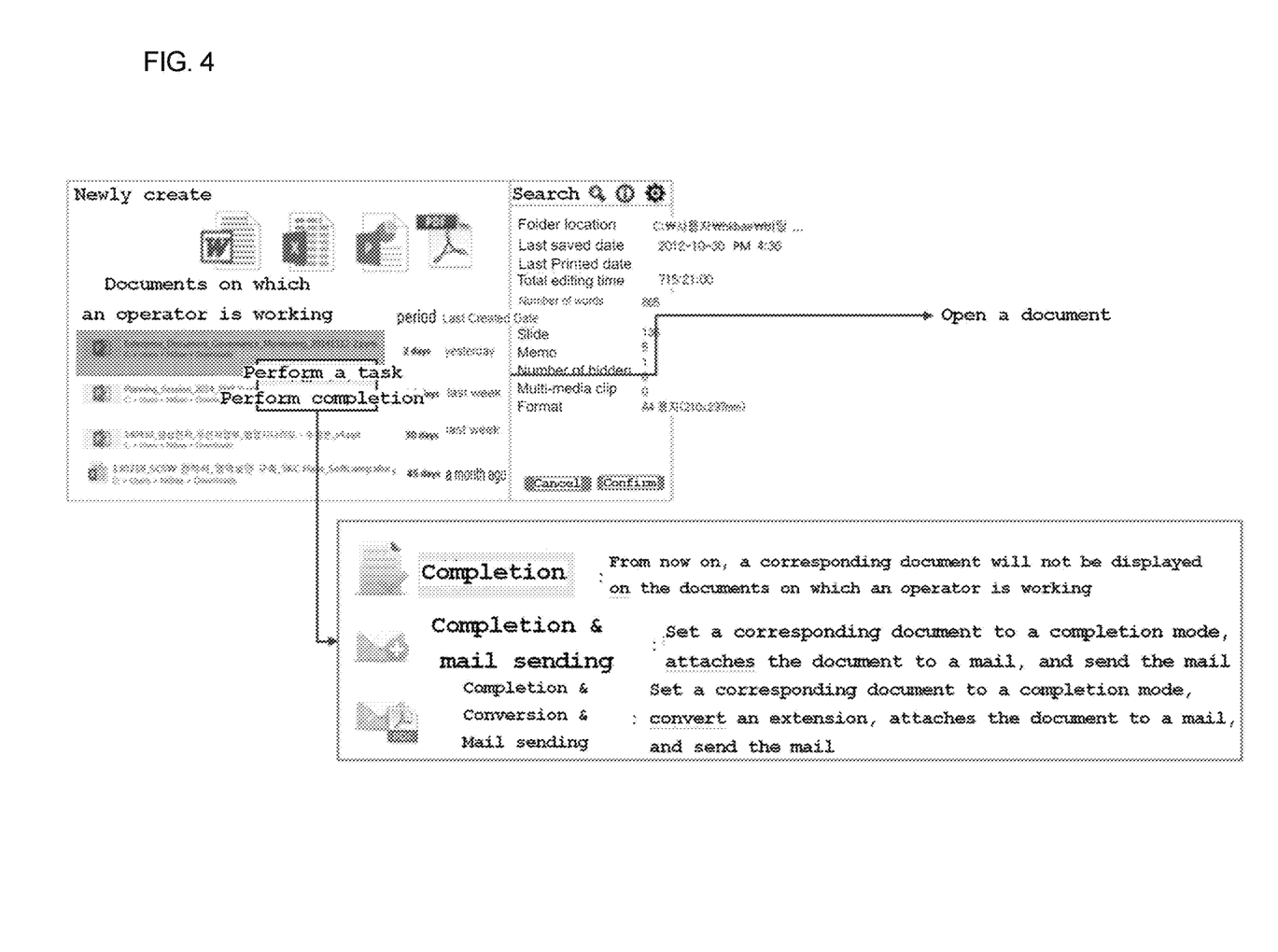
FIG. 4 is an image showing a situation in which a document is utilized by the document protection system according to the present invention.

FIG. 3 shows UI images illustrating the configurations of a template search layer, a document attribute setting layer, and a template layer and the configuration of a generation window that are output by the document protection system according to the present invention, and FIG. 4 is an image showing a situation in which a document is utilized by the document protection system according to the present invention.

S11: Template Search Step

When an operator attempts a specific task using his or her terminal 200, the template module 140 identifies the identification code of the operator via the authentication module 150, and outputs a template search layer and a document attribute setting layer for template search, as shown in FIG. 3.

More specifically, when the operator attempts a template search, the template module 140 outputs a template search layer first. Template extensions are posted to the template search layer in the form of icons or extension names, and the operator selects his or her desired extension.

Once the operator has completed the selection, the template module 140 outputs a document attribute setting layer. The document attribute setting layer is intended to receive document attributes, such as the file name, storage path and search keyword of the corresponding document, when a template is stored as a document. The template module 140 searches for a corresponding template stored in the template DB 110 and also generates document information based on the document attribute setting layer.

In this case, the template information includes a security level designated for each template or a level tag designated for each keyword of the template, and the corresponding template or document is executed within a range set according to the security level. More specifically, the template information of the template constitutes the security level. The security level defines the security class of the template, and may be classified as a "first level-secret," "second level-confidential," or "third level-public." Furthermore, such a level may be designated for each keyword in the form of a tag. As described above, the operator enters a keyword for the corresponding template in the document attribute setting layer, and the template module 140 searches the template DB 110 for the corresponding template according to the entered keyword. Furthermore, the level tag is set for the keyword according to the present embodiment, and thus the template module 140 sets the security level of the template by calculating the level tag of the entered keyword.

As a result, the template module 140 includes the security level designated for each template in the template information, or sets the security level of the corresponding template by calculating the level tag designated for each keyword and then includes the security level in the template information.

Meanwhile, with regard to the template information, an execution-authorized operator or execution range for the template or document is set according to the security level, and the template module 140 and the security module 160 limit the execution-authorized operator or execution range for the template or document.

Once the search for a template and the generation of the document information have been completed, the template module 140 executes a dedicated application corresponding to the corresponding template, and outputs the template.

S12: Document Generation Step

Figure 2:
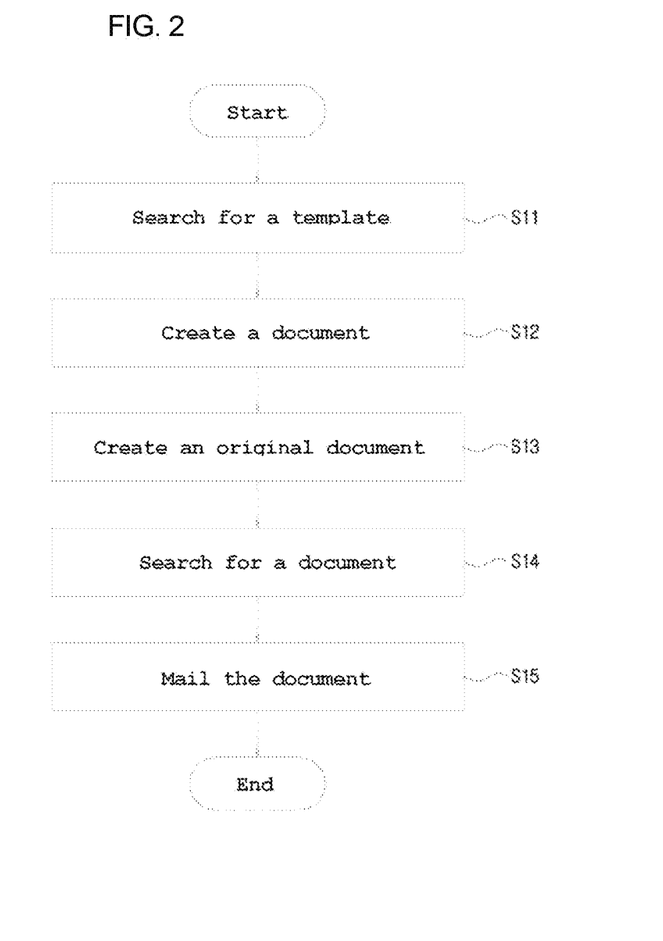
FIG. 2 is a flowchart showing the operational sequence of the document protection system according to an embodiment of the present invention.

The authentication module 150 generates document information by including the identification code of the operator in the corresponding template information according to the execution procedure of the template module 140. In the above-described template information generation process of the template module 140, the authentication module 150 searches the operator DB 120 for the identification code of the operator, and generates document information by including the retrieved identification code in the template information.

As a result, once the security level has been set via the template module 140 and the identification code has been included in the corresponding document information via the authentication module 150, the template is converted into a document and the document is stored in the document DB 130.

S13: Original Document Generation Step

When the operator enters items in the template converted into the document and attempt storage, the authentication module 150 receives the digital signature code of the operator according to the document storage procedure of the template module 140, and the template module 140 includes a digital signature code in the document information of the corresponding document, backs up the document as an original, and stores the original. A more detailed description of the generation of the original document will be given below.

S14: Document Search Step

When the operator logs in to the document protection apparatus 100 or attempts a document search, the template module 140 outputs a template search layer, as shown in FIG. 3. In this case, the template module 140 identifies the identification code of the corresponding operator via the authentication module 150, and searches for the document of the identification code in the document DB 130.

As shown in conjunction with the template search layer, the document retrieved as described above is classified into and displayed as a document category on which the operator is working, and the operator may select a required document while viewing a list of documents listed in the document category on which the operator is working.

As in the template search, when the corresponding document is retrieved and selected in the document DB 130, the template module 140 invokes the dedicated application, and executes the document.

S15: Document Mailing Step

The operator may send the document including content to another operator by e-mail. For this purpose, the application module 180 outputs one or more menus, and the operator selects a required function from the menu and sends a document by e-mail.

For reference, in the present embodiment, the menus of the application module 180 include a completion menu, a completion & mail sending menu, and a completion & conversion & mail sending menu, as shown in FIG. 4.

The completion menu enables the operator to declare that a document task is completed. When the operator selects the completion menu through the menu of the application module 180, the template module 140 sets the task mode of a document, stored in the document DB 130, to a task completion, and the template module 140 automatically searches for the corresponding document and prevents the document from being posted to the template search layer. This is intended to provide the convenience of work to the operator by classifying a document as a document on which a task is performed or a document for which a task is completed. The template module 140 is not limited to the illustrated process.

The completion & mail sending menu is intended to enable the operator to declare that a document task is completed and to mail a corresponding document via the e-mail processor of the application module 180. When the completion & mail sending menu is selected through the menu of the application module 180, the template module 140 sets the task mode of the document, stored in the document DB 130, to a task completion, and the e-mail processor of the application module 180 attaches the document for which a task is completed and which is stored in the document DB 130 and sends the document to a designated recipient.

The completion & conversion & mail sending menu is intended to enable the operator to declare that a document task is completed, to convert a corresponding document into a specific extension file format, and to mail a corresponding extension file via the e-mail processor of the application module 180. When the completion & conversion & mail sending menu is selected via the menu of the application module 180, the template module 140 sets the task mode of the document, stored in the document DB 130, to task completion and converts the file format of the corresponding document, and the e-mail processor of the application module 180 attaches the converted extension file and sends the file to a designated recipient.

Meanwhile, the menu of the application module 180 may include a higher menu for a task menu and a completion menu. When the operator selects the task menu, the template module 140 executes the corresponding document via the dedicated application.

Figure 5:
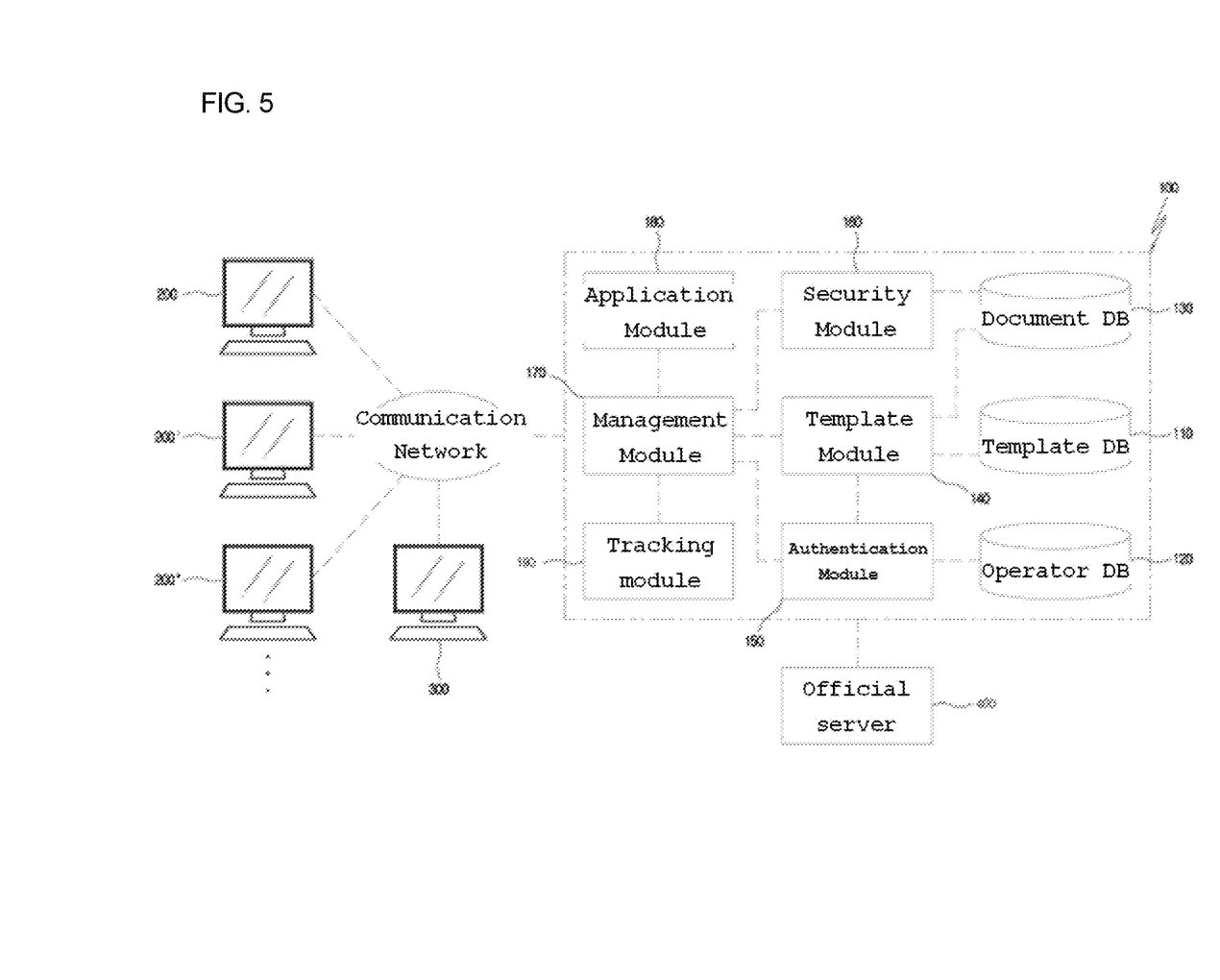
FIG. 5 is a block diagram showing a document protection system according to another embodiment of the present invention.
Figure 6:
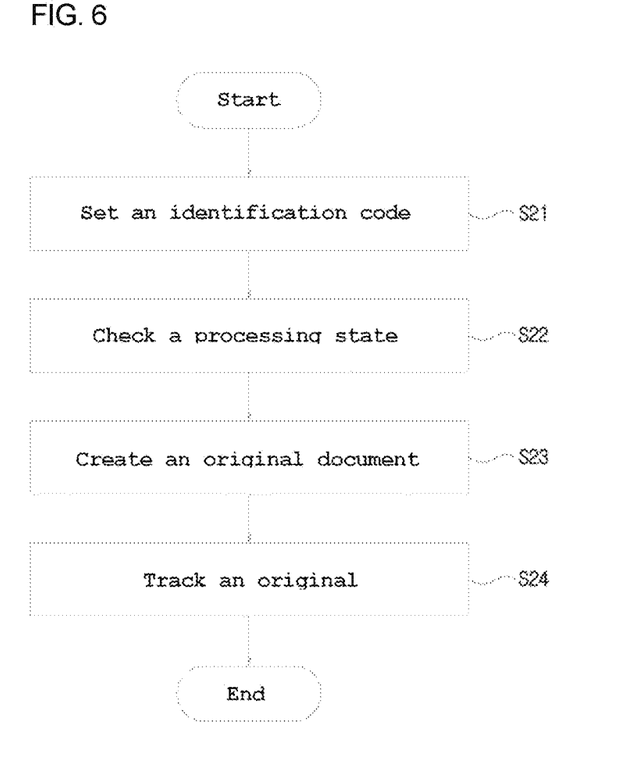
FIG. 6 is a flowchart showing the operational sequence of the document protection system according to the other embodiment of the present invention.
Figure 7:
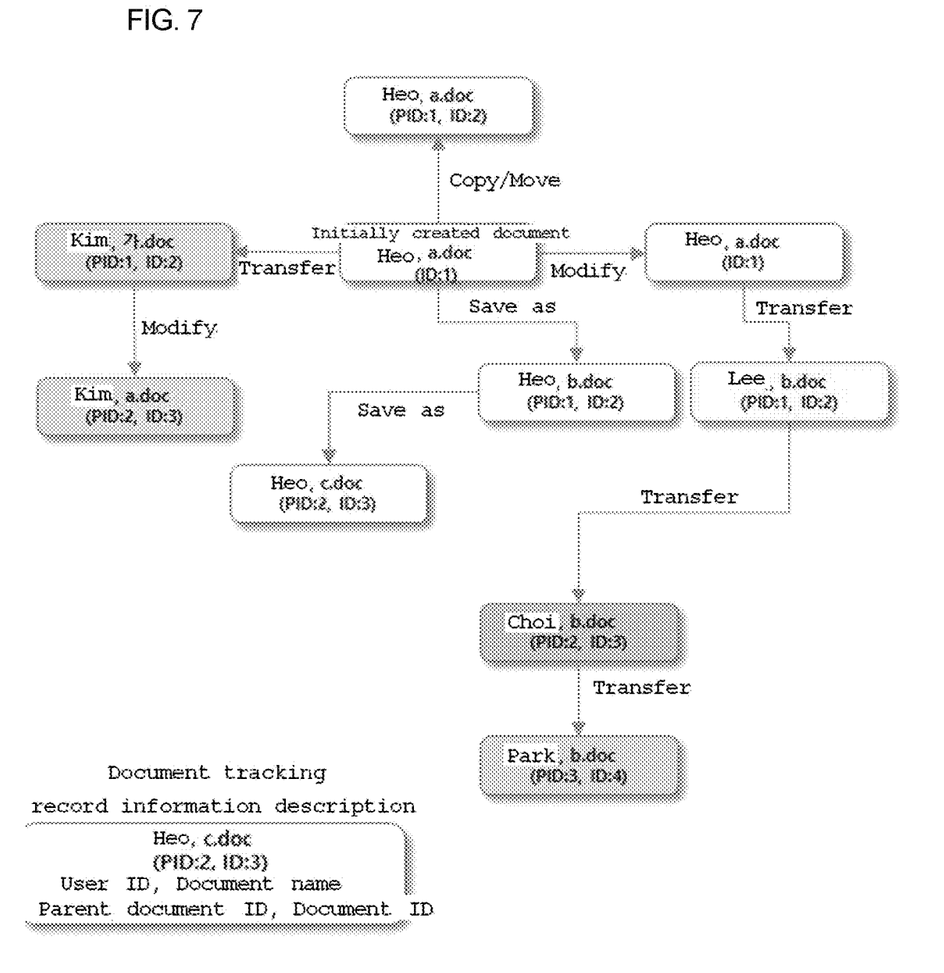
FIG. 7 is a UI image showing the document distribution tracking of the document protection system according to the present invention.
Figure 8:
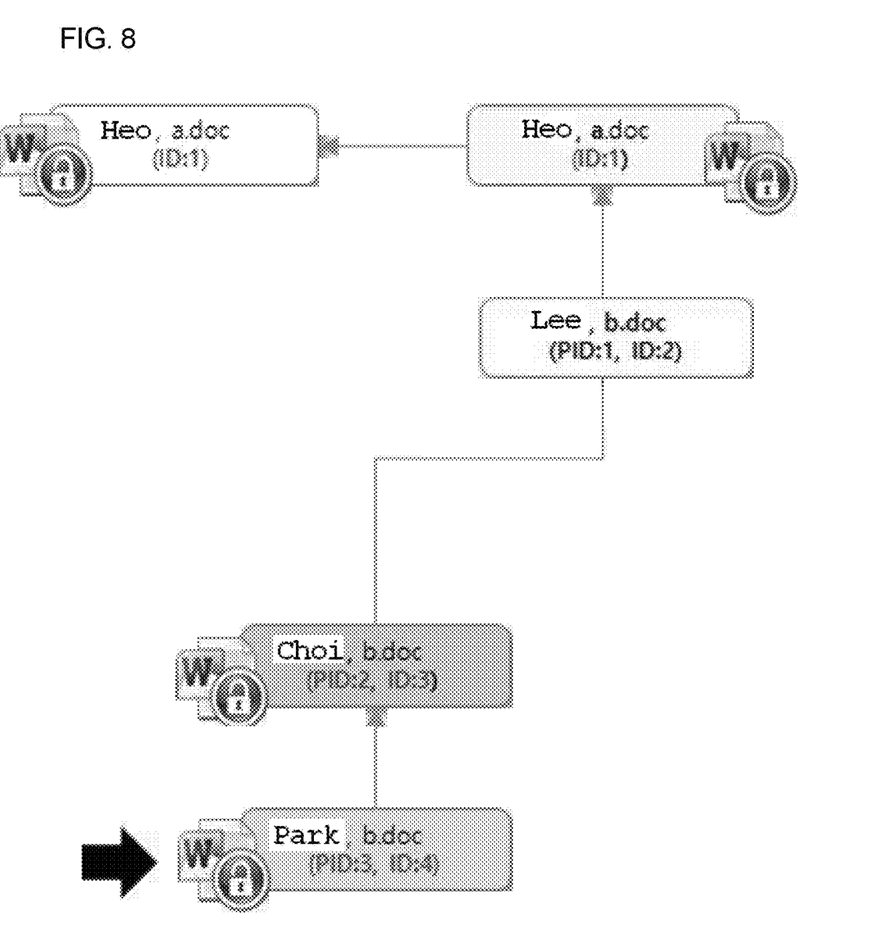
FIG. 8 is a UI image showing the original document tracking of the document protection system according to the present invention.

FIG. 5 is a block diagram showing a document protection system according to another embodiment of the present invention, FIG. 6 is a flowchart showing the operational sequence of the document protection system according to the other embodiment of the present invention, FIG. 7 is a UI image showing the document distribution tracking of the document protection system according to the present invention, and FIG. 8 is a UI image showing the original document tracking of the document protection system according to the present invention.

The document protection system according to the present embodiment further includes a tracking module 190 configured to track the distribution path of the corresponding document according to the identification code included in the document information.

For this purpose, the authentication module 150 according to the present embodiment includes the identification codes of all the previous and current operators of the corresponding document in the document information when including the identification code of the operator in the document information at step S21.

Although a document may be drafted, finally completed and discarded by a single operator, a plurality of operators shares and repeatedly revises and reviews a document through collaboration in a company in which many operators work together. Accordingly, the operator of even the same document is frequently changed.

When the template module 140 searches for and executes the document, the authentication module 150 newly includes the identification code of the operator in the corresponding document information, and maintains the identification code of a previous operator in the document information. As a result, the document information always includes two or more identification codes. The authentication module 150 determines whether or not corresponding identification codes are the same, defines the processing state of the document, and includes a corresponding processing code in the document information.

The definition of the document processing state of the authentication module 150 will be described more specifically. Since the document information of the document includes two or more identification codes, the authentication module 150 determines whether or not two identification codes are the same based on the document information of the document. In this case, when the two identification codes are the same, the authentication module 150 defines the processing state as the same operator having modified the corresponding document, having saved the corresponding document under a different name, or having adjusted a storage path. However, when the two identification codes are different, the authentication module 150 defines the processing state as a previous operator having transferred a corresponding document to a current operator because the previous operator and the current operator are not the same.

When the definition of the processing state is completed, the authentication module 150 includes a processing code corresponding to the processing state in the document information, thereby enabling a third-party administrator console 300 to easily identify the relationship between documents and determine a distribution path.

As described above, the codes included in the document information in the present embodiment are the identification code of the operator and the processing code of the processing state. A document name code, a parent document code, and a document code may be included in the document information in order to subdivide the processing state into "copy/move," "modify," "transfer," and "save as."

For reference, when document A is copied to document B, i.e., the same document, the operator identification codes and document name codes of documents A and B are the same, and the parent document code of document B is the same as the document code of document A. Furthermore, when document A is transferred to another operator as document B without modification, the operator identification codes of documents A and B are not the same, and the parent document code of document B is not the same as the document code of document A. Furthermore, when document A is saved as document B without modification, the operator identification codes of documents A and B are the same, the parent document code of document B is the same as the document code of document A, and the document name codes of documents A and B are not the same. Furthermore, when document A is modified to document B, the operator identification codes and document name codes of documents A and B are the same, and a parent document code is not generated.

When the operator completes a document task, the template module 140 sets the task mode of the corresponding document to "completion," and the authentication module 150 receives the digital signature of the operator, processes the digital signature of the operator, and includes the digital signature of the operator in the document information of the corresponding document. As is well known, a hash of the corresponding document is generated through the digital signature. Whenever the operator completes and stores the document, the authentication module 150 executes a digital signature process for the purpose of security, and continuously generates and updates a digital signature code in the document information.

Meanwhile, when the authentication module 150 generates a first digital signature code for a document, the template module 140 backs up the corresponding document as an original document, and registers it in a separate apparatus. In this case, the separate apparatus may be an official server 400 of an official institution such as the Korean Intellectual Property Office or the Korean Ministry of Commerce, Industry and Energy in order to guarantee public trust at step S23.

Accordingly, the first original document created by the worker is saved and stored separately, and the distribution process of the document and the original document are tracked and protected based on a configuration code for each piece of document information described above at step S24.

As shown in FIG. 8, in order for the operator to track the original of document A whose identification code is "Park," whose document name code is "b.doc," whose parent document code is "3" and whose document code is "4," the tracking module 190 searches for document B, whose identification code is "Choi," whose document name code is "b.doc," whose parent document code is "2" and whose document code is "3," based on the parent document code. Thereafter, in this way, the tracking module 190 tracks the parent document of document B, and finally tracks an original document whose identification code is "Heo," whose document name code is "a.doc," whose parent document code is none and whose document code is "1."

Since the original document tracked as described above is registered in the official server 400, the operator may search for the corresponding original document and use it for work as desired.

The present invention provides the effect of providing the network-based document protection system for the protection of business secret, which sets the security level of a corresponding document according to objective criteria without depending on the subjective judgment of an operator and enables the original of the protection target document to be protected and one or more persons in charge to be determined through the tracking of the distribution of the document.

Although the present invention has been described with reference to the specific embodiments of the present invention, it will be appreciated by those having ordinary skill in the art to which the present invention pertains that the present invention may be modified or altered in various manners without departing from the scope and technical spirit of the present invention set forth in the attached claims.

What is claimed is:

1. A document protection system in which a document protection apparatus installed with computer process modules to search for and execute information in databases (DBs) performs data communication with a terminal over a network, wherein the system comprises:
   a processor, a memory coupled to the processor, wherein the processor is capable of executing the computer process modules stored in memory;
   the DBs comprise:
   a template database (DB) condigured to store template information, including content of each template, a name of the template, a storage path of the template, a search keyword, and information about a word processor dedicated to execution of the template;
   a document DB configured to store document information, including content of each document, a name of the document, a storage path of the document, information about a word processor dedicated to execution of the document, and identification codes of one or more document operators; and
   an operator DB configured to store personal information and an identification code of each operator;
   the computer process modules comprise:
   a template module configured to search for template information regarding an input keyword in a template DB and execute a template of the found template information by using a dedicated word processor included in the found template information, and to search for document information regarding an input keyword in the document DB and execute a document of the found document information by using a dedicated word processor included in the found document information;
   an authentication module configured to generate document information by including an identification code of an operator, found in the operator DB, in the corresponding template information when the template module executes the template and to identify an operator by recognizing an identification code in the document information of the executed document when the template module executes the document, according to an execution procedure of the template module; and
   a security module configured to encrypt a document generated or updated via the dedicated word processor, to store the encrypted document in the document DB, and to decrypt the encrypted document;
   the authentication module: includes an identification code of a previous operator and an identification code of a current operator in document information; when the identification code of the previous operator and the identification code of the current operator match each other, defines a processing state as a state in which the oerator of the identification code has modified a document of the document information, has stored a document of the document information under a different document name, or has adjusted a storage path of a document of the document information, and then includes a processing code of the processing state in the document information; and, when the identification code of the previous operator is different from the identification code of the current operator, defines a processing state as a state in which a document of the document information has been transferred from the previous operator to the current operator, and then includes a processing code of the processing state in the document information; and
   the template module sets a task mode of a document, stored in the document DB, to task completion when an operator selects a completion menu, outputs a template search layer with a template extension posted thereon when the operator selects a search menu, and prevents the document, for which the take completion have been set, from being posted on the template search layer.

2. A document protection system of claim 1, wherein:
   the template module includes a security level designated for each template in the template information, or calculates a level tag designated for each keyword, sets a security level of the corresponding template, and includes the security level in the template information; and
   the template module and the document module limit an execution-authorized operator or execution range of the template or document according to the security level.

3. A document protection system of claim 1, further comprising an application module configured to process a file of the document executed by the template module and to mail the file of the document.

4. A document protection system of claim 1, wherein:
the authentication module receives a digital signature code of the operator according to a document storage procedure of the template module; and
the template module includes the digital signature code in the document information of the corresponding document, backs up the document as an original, and stores the original.

5. A document protection system of claim 4, wherein the template module separately stores the original backup of the document in an official server.

* * * * *